US012675089B2

(12) United States Patent
Kumamoto et al.

(10) Patent No.: US 12,675,089 B2
(45) Date of Patent: Jul. 7, 2026

(54) MACHINE TOOL CONTROL DEVICE

(71) Applicant: FANUC CORPORATION, Yamanashi (JP)

(72) Inventors: Yuuki Kumamoto, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 673 days.

(21) Appl. No.: 18/004,419

(22) PCT Filed: Jul. 7, 2021

(86) PCT No.: PCT/JP2021/025630
§ 371 (c)(1),
(2) Date: Jan. 5, 2023

(87) PCT Pub. No.: WO2022/009925
PCT Pub. Date: Jan. 13, 2022

(65) Prior Publication Data
US 2023/0333532 A1    Oct. 19, 2023

(30) Foreign Application Priority Data

Jul. 10, 2020    (JP) ................................. 2020-119085

(51) Int. Cl.
*G05B 19/19*    (2006.01)
*B23Q 15/08*    (2006.01)
(Continued)

(52) U.S. Cl.
CPC ............. *G05B 19/19* (2013.01); *B23Q 15/08* (2013.01); *B23Q 15/14* (2013.01); *G05B 19/182* (2013.01);
(Continued)

(58) Field of Classification Search
CPC .. G05B 19/19; G05B 19/182; G05B 19/4166; G05B 19/404; G05B 19/4155;
(Continued)

(56) References Cited

U.S. PATENT DOCUMENTS 4,873,793 A * 10/1989 Asano .................. G05B 19/184
451/228
5,777,294 A * 7/1998 Sugahara ............... B23K 26/08
219/121.72
(Continued)

FOREIGN PATENT DOCUMENTS

CN        107797515 A    3/2018
CN        110347112 A    10/2019
(Continued)

OTHER PUBLICATIONS

International Search Report issued in PCT/JP2021/025630; mailed Sep. 28, 2021.

*Primary Examiner* — Ronald D Hartman, Jr.
(74) *Attorney, Agent, or Firm* — Studebaker Brackett PLLC

(57) ABSTRACT

Provided is a machine tool control device that makes it possible to alleviate shock generated in a machine tool during an oscillation cutting process. A control device 1 for a machine tool that carries out a process by relatively oscillating a tool and a workpiece is provided with: an oscillation command generation unit 13 that generates an oscillation command on the basis of an oscillation condition; an oscillation start/end determination unit 14 that determines start/end of oscillation on the basis of the oscillation command; and a position speed control unit 18 that relatively oscillates the tool and the workpiece on the basis of a superimposed command generated by superimposing the oscillation command on a moving command according to a determination result of the oscillation start/end determina- (Continued)

OSCILLATION CONDITION SETTER ~12    10    1

EXTERNAL SIGNAL (OSCILLATION ON/OFF)    OSCILLATION COMMAND GENERATOR ~13

OSCILLATION START/END DETERMINATOR ~14

OSCILLATION COMMAND    LEARNING CONTROLLER ~16    18    30

MOVEMENT COMMAND    SUPERIMPOSITION COMMAND    COMPENSATION AMOUNT    POSITION/SPEED CONTROLLER    MOTOR 11    15    17

POSITION DEVIATION

POSITION FEEDBACK tion unit 14. The oscillation start/end determination unit 14 determines start/end of oscillation when the absolute value of the oscillation command is no greater than a predetermined value.

6 Claims, 6 Drawing Sheets

(51) Int. Cl.
| | | |
|---|---|---|
| *B23Q 15/12* | (2006.01) | |
| *B23Q 15/14* | (2006.01) | |
| *G05B 19/18* | (2006.01) | |
| *G05B 19/416* | (2006.01) | |

(52) U.S. Cl.
CPC .......... *G05B 19/4166* (2013.01); *B23Q 15/12* (2013.01); *G05B 2219/50049* (2013.01)

(58) Field of Classification Search
CPC .. G05B 19/4163; B23Q 15/013; B23Q 15/08; B23Q 15/14; B23Q 13/08; B23Q 15/12
USPC ......................................................... 700/192
See application file for complete search history.

(56) References Cited

U.S. PATENT DOCUMENTS

| | | | | |
|---|---|---|---|---|
| 10,286,513 | B2 * | 5/2019 | Yamamoto | B23Q 15/12 |
| 10,509,387 | B2 * | 12/2019 | Yamamoto | G05B 19/182 |
| 10,705,502 | B2 * | 7/2020 | Watanabe | G05B 19/19 |
| 10,802,461 | B2 * | 10/2020 | Yamamoto | G05B 19/19 |
| 11,086,284 | B2 * | 8/2021 | Yamamoto | G05B 19/19 |
| 11,137,737 | B2 * | 10/2021 | Morihashi | G05B 19/4155 |
| 11,435,723 | B2 * | 9/2022 | Morihashi | G05B 19/404 |
| 11,541,500 | B2 * | 1/2023 | Morihashi | B23Q 17/2233 |
| 11,717,926 | B2 * | 8/2023 | Horikawa | B23Q 17/20 700/124 |
| 2009/0107308 | A1 * | 4/2009 | Woody | B23B 35/00 82/1.11 |
| 2013/0063724 | A1 * | 3/2013 | Tovey | G01N 21/253 356/399 |
| 2014/0364993 | A1 * | 12/2014 | Matsushita | G05B 19/404 700/193 |
| 2017/0075337 | A1 * | 3/2017 | Kameta | G05B 19/402 |
| 2017/0285608 | A1 * | 10/2017 | Sonoda | G05B 19/416 |
| 2017/0329302 | A1 * | 11/2017 | Sonoda | G05B 19/404 |
| 2018/0067466 | A1 * | 3/2018 | Sonoda | G05B 19/416 |
| 2018/0281090 | A1 * | 10/2018 | Watanabe | G05B 19/4093 |
| 2018/0281139 | A1 * | 10/2018 | Yamamoto | B23B 13/08 |
| 2018/0297163 | A1 * | 10/2018 | Sonoda | B23Q 15/0075 |
| 2018/0297164 | A1 * | 10/2018 | Sonoda | B23Q 15/14 |
| 2018/0299857 | A1 * | 10/2018 | Oho | G05B 19/25 |
| 2018/0335765 | A1 * | 11/2018 | Tezuka | G05B 19/404 |
| 2019/0107820 | A1 * | 4/2019 | Yasuda | G05B 19/182 |
| 2019/0310600 | A1 * | 10/2019 | Yamamoto | G05B 19/182 |

FOREIGN PATENT DOCUMENTS

| | | | |
|---|---|---|---|
| CN | 110362033 | A | 10/2019 |
| JP | H07-024574 | A | 1/1995 |
| JP | H10-166224 | A | 6/1998 |
| JP | 2011-248473 | A | 12/2011 |
| JP | 2018-180633 | A | 11/2018 |
| JP | 2018-180990 | A | 11/2018 |
| JP | 2019-028597 | A | 2/2019 |

* cited by examiner

FIG. 1

IN CASE WHERE TIMING OF
STARTING/ENDING SUPERIMPOSITION OF OSCILLATION COMMAND
DEVIATES FROM OSCILLATION PHASE OF 0, 180 deg
SUPERIMPOSITION COMMAND

TIME

IN CASE WHERE TIMING OF
STARTING/ENDING SUPERIMPOSITION OF OSCILLATION COMMAND
DOES NOT DEVIATE FROM OSCILLATION PHASE OF 0, 180 deg
SUPERIMPOSITION COMMAND

TIME

IN CASE WHERE TIMING OF
STARTING/ENDING SUPERIMPOSITION OF OSCILLATION COMMAND
DEVIATES FROM PHASE AT WHICH OSCILLATION COMMAND IS 0

IN CASE WHERE TIMING OF
STARTING/ENDING SUPERIMPOSITION OF OSCILLATION COMMAND
DOES NOT DEVIATE FROM PHASE AT WHICH OSCILLATION COMMAND IS 0

SUPERIMPOSITION COMMAND

MACHINE TOOL CONTROL DEVICE

TECHNICAL FIELD

The present invention relates to a machine tool control device.

BACKGROUND ART

Typically, oscillation cutting has been employed in some cases as measures taken against chips caused in, e.g., cutting in a drilling or turning process. For example, in order to implement oscillation cutting, a technique of superimposing as oscillation command on a movement command has been known (see, e.g., Patent Document 1). According to this technique, oscillation cutting can be performed according to a superimposition command generated by superimposition of the oscillation command on the movement command while the chips are being generated.

Patent Document 1: Japanese Unexamined Patent Application, Publication No. 2019-28597

DISCLOSURE OF THE INVENTION

Problems to be Solved by the Invention

Depending on an oscillation phase at the start/end of superimposition of the oscillation command on the movement command, a discontinuous superimposition command is generated by superimposition of the oscillation command. Due to such a discontinuous superimposition command, acceleration rapidly changes and shock is caused on a machine tool in some cases. If the shock is caused on the machine tool, such shock might provide an adverse effect on machining accuracy.

For these reasons, there has been a demand for a machine tool control device capable of reducing the shock caused on the machine tool in oscillation cutting.

Means for Solving the Problems

One aspect of the present disclosure is a control device for a machine tool that performs machining while causing a tool and a workpiece to oscillate relative to each other. The machine tool control device includes an oscillation command generator that generates an oscillation command based on an oscillation condition, an oscillation start/end determinator that determines the start/end of oscillation based on the oscillation command, and a controller that causes the tool and the workpiece to oscillate relative to each other based on a superimposition command generated by superimposition of the oscillation command on a movement command according to a result of determination by the oscillation start/end determinator. The oscillation start/end determinator determines the start/end of oscillation in a case where an absolute value of the oscillation command is a specified value or less.

Effects of the Invention

According to one aspect of the present disclosure, the machine tool control device can be provided, which is capable of reducing shock caused on a machine tool in oscillation cutting.

BRIEF DESCRIPTION OF THE DRAWINGS

FIG. 1 is a diagram showing the configuration of a machine tool control device according to a first embodiment of the present disclosure;

PREFERRED MODE FOR CARRYING OUT THE INVENTION

Figure 2:
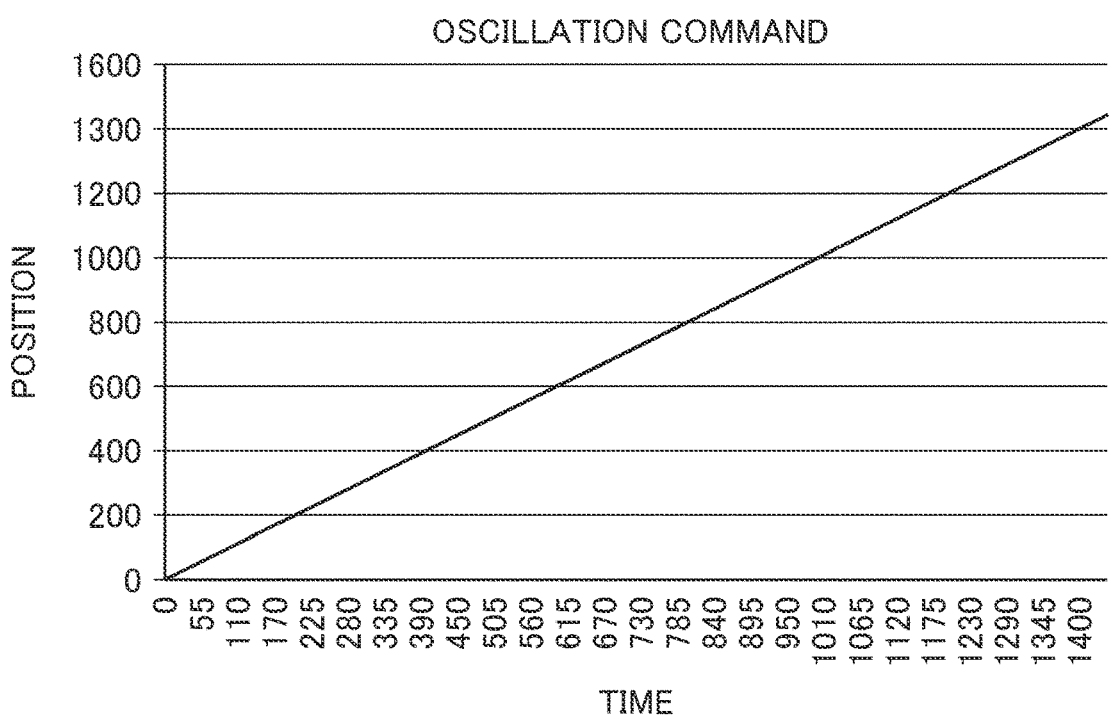
FIG. 2 is a graph showing one example of a movement command.

Hereinafter, embodiments of the present disclosure will be described in detail with reference to the drawings. Note that in description of a second embodiment or later, description of components and advantageous effects common to those of a first embodiment will be omitted and only components and advantageous effects different from those of the first embodiment will be described. In the present specification, an oscillation command means an instantaneous value of a command at a certain oscillation phase, and an oscillation amplitude means an amplitude value of a sine wave or a cosine wave.

First Embodiment

Figure 1:
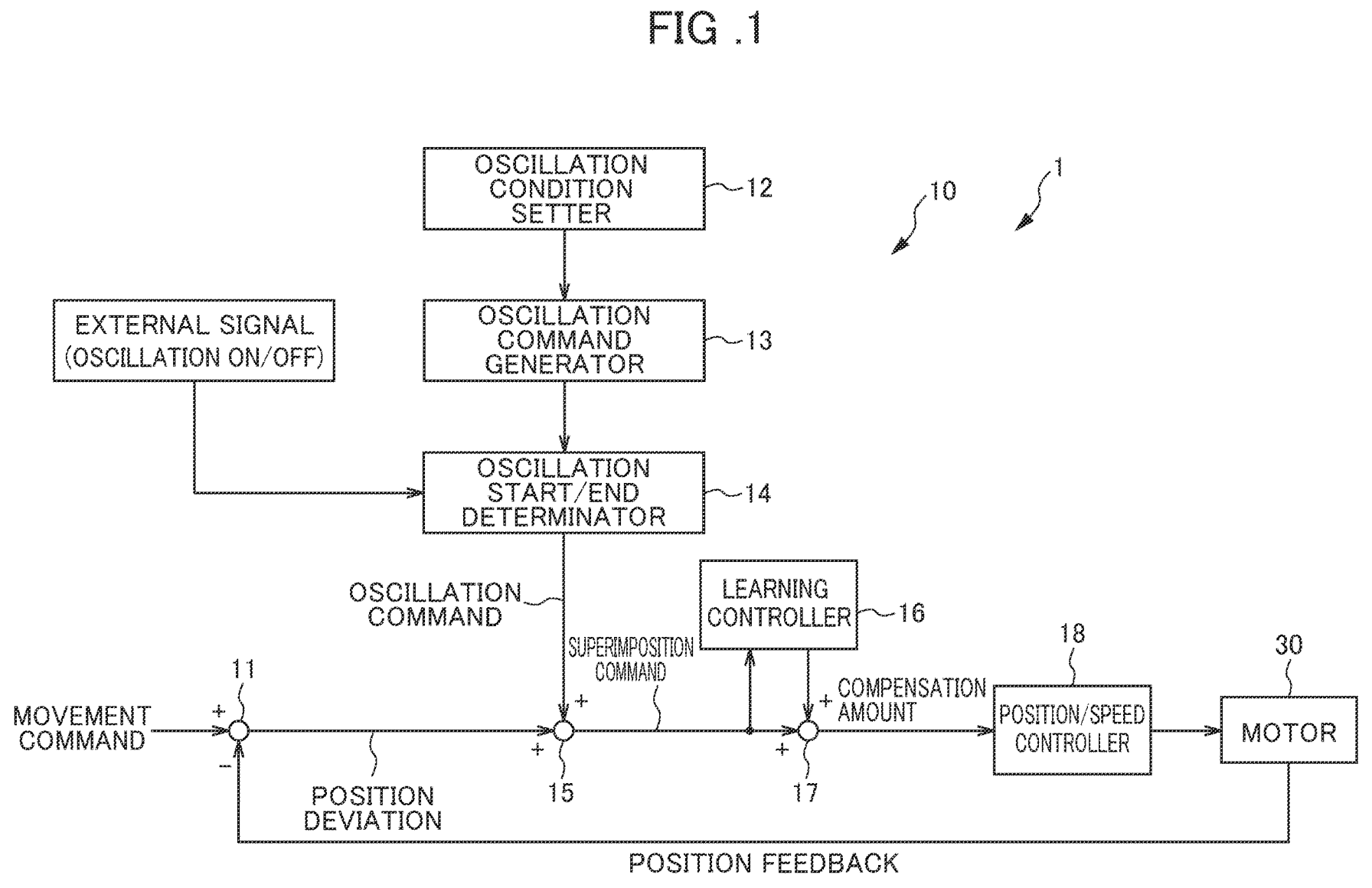

FIG. 1 is a functional block diagram of a machine tool control device 1 according to the first embodiment of the present disclosure. As shown in FIG. 1, the machine tool control device 1 according to the present embodiment includes a servo control device 10, and controls driving of a motor 30 that drives a feed shaft.

As shown in FIG. 1, the machine tool control device 1 according to the present embodiment includes a first adder 11, an oscillation condition setter 12, an oscillation command generator 13, an oscillation start/end determinator 14, a second adder 15, a learning controller 16, a third adder 17, and a position/speed controller 18.

As shown in FIG. 1, in the machine tool control device 1 according to the present embodiment, a movement command for the motor 30 is input to the first adder 11 of the later-described servo control device 10, the movement command being generated based on a machining condition by a not-shown movement command generator.

The first adder 11 calculates a position deviation. Specifically, the first adder 11 calculates a position deviation which is a difference between a position command and a position feedback based on position detection on the feed shaft by an encoder of the motor 30.

The oscillation condition setter 12 sets an oscillation condition. Specifically, the oscillation condition setter 12 sets the oscillation amplitude or an oscillation amplitude multiplying factor and an oscillation frequency or an oscillation frequency multiplying factor. The oscillation condition including the oscillation amplitude or the oscillation amplitude multiplying factor and the oscillation frequency or the oscillation frequency multiplying factor is input to the later-described oscillation command generator 13.

The oscillation command generator 13 generates the oscillation command based on the oscillation condition. The oscillation command generator 13 may obtain the oscillation command from the machining condition and the oscillation condition including the oscillation amplitude multiplying factor and the oscillation frequency multiplying factor, or may obtain the oscillation command from the oscillation condition including the oscillation amplitude and the oscillation frequency. The condition including the multiplying factors and the condition including the non-multiplying factors may be combined as necessary. That is, the oscillation command can be generated without use of the machining condition as long as the oscillation amplitude and the oscillation frequency are directly set as the oscillation condition in consideration of application to, e.g., a case where an oscillation shaft is stopped.

The oscillation start/end determinator 14 determines the start/end of oscillation based on the oscillation command. Determination on the start/end of oscillation by the oscillation start/end determinator 14 will be described later in detail.

The second adder 15 generates a superimposition command. Specifically, the second adder 15 generates a superimposition command by superimposition of the oscillation command generated by the oscillation command generator 13 on the position deviation calculated by the first adder 11. Note that the second adder 15 may be configured to add the oscillation command generated by the oscillation command generator 13 to the movement command. Alternatively, the oscillation command generator 13 may be configured to generate the oscillation command (a speed command), and the second adder 15 may be configured to add the oscillation command to the movement command (a speed command).

Moreover, the second adder 15 superimposes the oscillation command on the position deviation according to a result of determination by the oscillation start/end determinator 14. That is, the second adder 15 starts superimposition of the oscillation command on the position deviation in a case where the oscillation start/end determinator 14 has determined that oscillation starts, and ends superimposition of the oscillation command on the position deviation in a case where the oscillation start/end determinator 14 has determined that oscillation ends.

The learning controller 16 calculates a superimposition command compensation amount based on the superimposition command, and compensates the superimposition command in such a manner that the calculated compensation amount is added to the superimposition command by the third adder 17. The learning controller 16 has a memory, stores, in the memory, the oscillation phase and the compensation amount in association with each other in one or more cycles of oscillation, reads the compensation amount stored in the memory at a timing of being able to compensate a phase lag in oscillation according to responsiveness of the motor 30, and outputs the compensation amount to the third adder 17. In a case where the oscillation phase associated with the compensation amount to be output is not stored in the memory, the compensation amount to be output may be calculated from a compensation amount associated with an oscillation phase close to the above-described oscillation phase. Generally, the position deviation for the oscillation command increases as the oscillation frequency, increases. Thus, the learning controller 16 performs compensation so that followability to the cyclical oscillation command can be improved. As a result, followability to the superimposition command can also be improved, and shock caused on a machine tool during oscillation cutting can be reduced. Accordingly, machining accuracy can be improved.

The position/speed controller 18 generates, based on the superimposition command after addition of the compensation amount, a torque command for the motor 30 that drives the feed shaft, thereby controlling the motor 30 according to the generated torque command. Accordingly, machining is performed while a tool and a workpiece are oscillating relative to each other.

Next, determination on the start/end of oscillation by the oscillation start/end determinator 14 will be described in detail. The oscillation start/end determinator 14 of the present embodiment determines the start/end of oscillation in a case where an absolute value of the oscillation command is a specified value or less. The specified value may be set to, e.g., a value of 0 or a value close thereto, and may be calculated based on an acceleration. In a case where an oscillation start/end condition is satisfied at this timing, it is determined that oscillation starts/ends. For example, determination may be made based on the oscillation amplitude, the movement command, a notification from an upper control device that manages a machining program, or an external signal. In a case where determination is made based on the oscillation amplitude or the movement command, it may be determined that oscillation starts in the case of the specified value or more, and it may be determined that oscillation ends in the case of less than the specified value. The specified value for determination on the start/end may have a hysteresis. In a case where determination is made based on the notification from the upper control device or the external signal, it may be determined that oscillation starts when the start (ON) is notified, and it may be determined that oscillation ends when the end (OFF) is notified. The absolute value of the oscillation command to be superimposed on the position deviation is the specified value or less so that discontinuous superimposition command generation at the start/end of oscillation can be reduced and the shock caused on the machine tool can be reduced.

Note that in the present embodiment, the oscillation start/end determinator 14 determines a timing of starting/ending oscillation, and therefore, such a timing may deviates from an oscillation start/end timing specified by the machining program. The oscillation start/end determinator 14 may be configured to determine a timing of starting/ending oscillation such that the amount of deviation from the oscillation start/end timing specified by the machining program is within a predetermined range.

Figure 3:
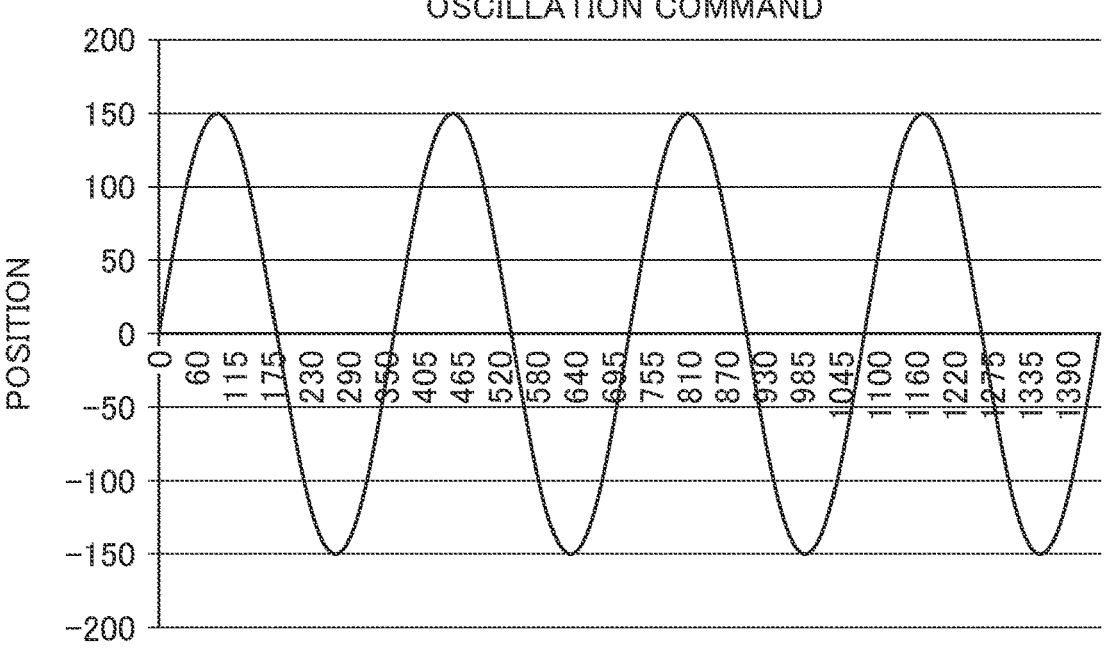
FIG. 3 is a graph showing one example of an oscillation command.

Determination on the start/end of oscillation by the oscillation start/end determinator 14 will be more specifically described with reference to specific examples shown in FIGS. 2 to 8. FIG. 2 is a graph showing one example of the movement command in a case where the movement command is constant. In a case where the movement command shown in FIG. 2 is a constant speed, a linear command is shown such that a time and a movement amount are in a proportional relationship. FIG. 3 is a graph showing one example of the oscillation command in a case where the command is in the form of a sine wave.

Figure 4:
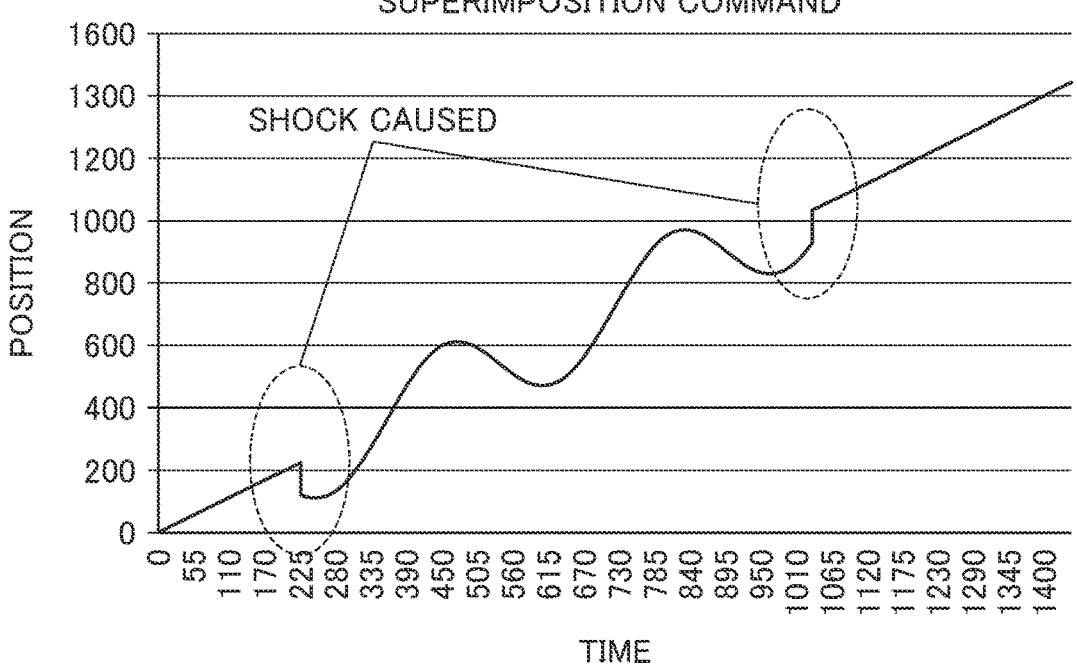
FIG. 4 is a graph showing a superimposition command in a case where a timing of starting/ending superimposition of the oscillation command of FIG. 3 on the movement command of FIG. 2 deviates from an oscillation phase of 0° and 180°.

FIG. 4 is a graph showing the superimposition command in a case where a timing of starting/ending superimposition of the oscillation command of FIG. 3 on the movement command of FIG. 2 deviates from an oscillation phase of 0° and 180°. Since the oscillation command of FIG. 3 is the sine wave, the oscillation command is 0 at an oscillation phase of 0° and 180°. Thus, if a timing of starting/ending superimposition of the oscillation command of FIG. 3 deviates from an oscillation phase of 0° and 180°, the oscillation command is a value other than 0, and for this reason, the command at the start/end of superimposition is discontinuous as shown in FIG. 4. In FIG. 4, portions surrounded by dashed lines indicate the start/end of superimposition, and show occurrence of great shock.

Figure 5:
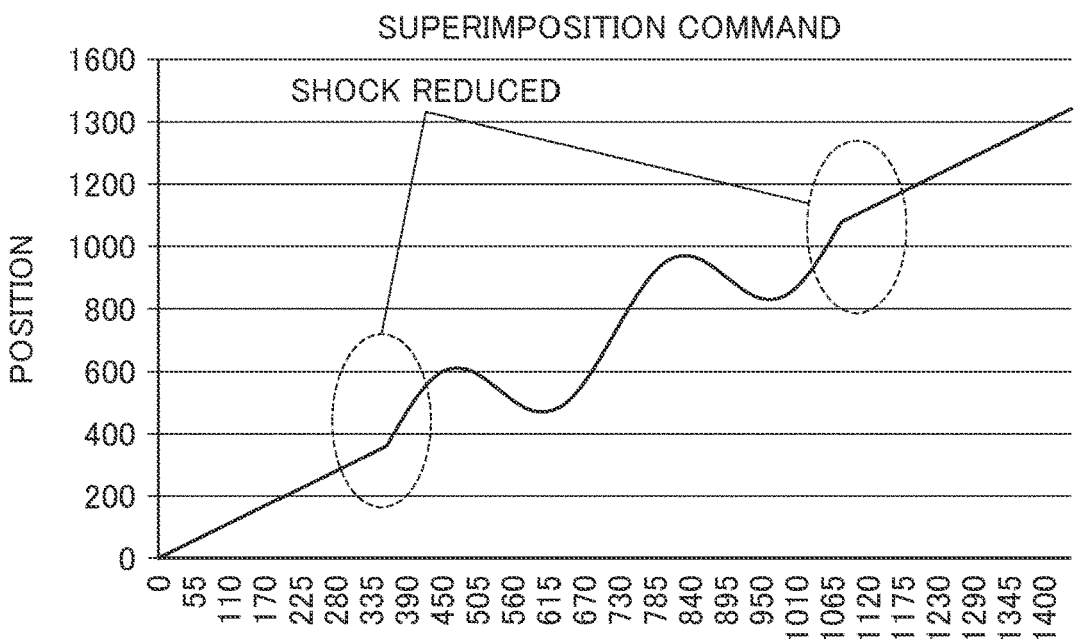
FIG. 5 is a graph showing a superimposition command in a case where a timing of starting/ending superimposition of the oscillation command of FIG. 3 on the movement command of FIG. 2 does not deviate from an oscillation phase of 0° and 180°.

On the other hand, FIG. 5 is a graph showing the superimposition command in a case where a timing of starting ending superimposition of the oscillation command of FIG. 3 on the movement command of FIG. 2 does not deviate from an oscillation phase of 0° and 180°. If a timing of starting ending superimposition of the oscillation command of FIG. 3 is at an oscillation phase of 0° and 180°, the oscillation command is 0, and therefore, the command at the start/end of superimposition is continuous and smooth as shown in FIG. 5. In FIG. 5, portions surrounded by dashed lines indicate the start/end of superimposition, and show shock reduction.

Figure 6:
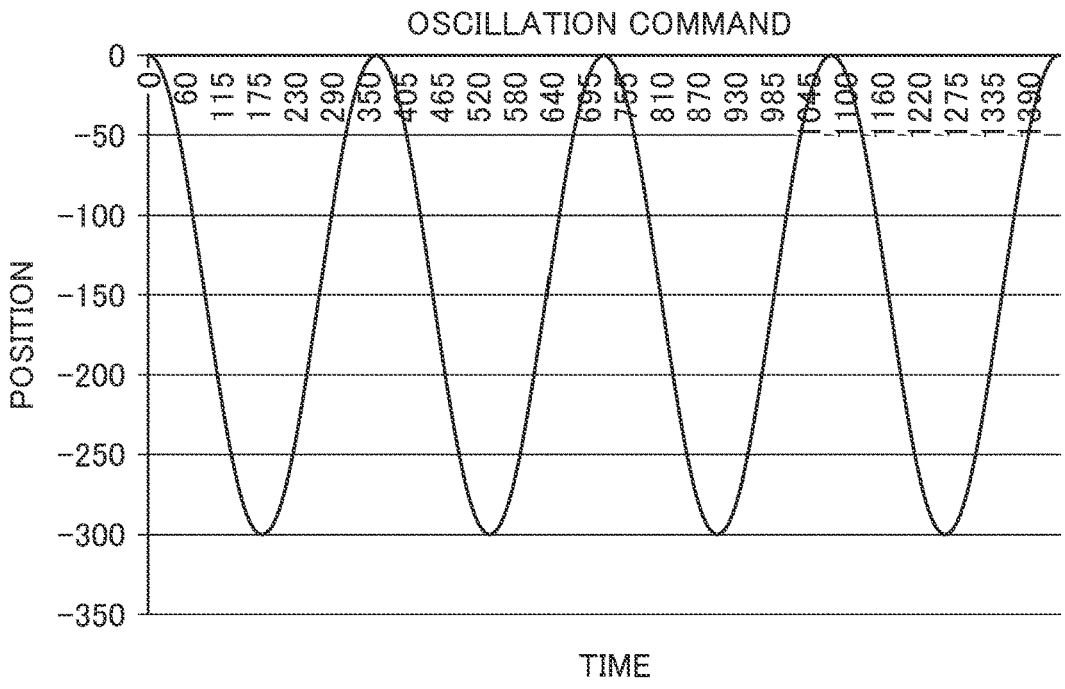
FIG. 6 is a graph showing another example of the oscillation command.

FIG. 6 is a graph showing another example of the oscillation command. As in the oscillation command shown in FIG. 6, the oscillation command may be in the form of a cosine wave and a position on the vertical axis may be offset.

Figure 7:
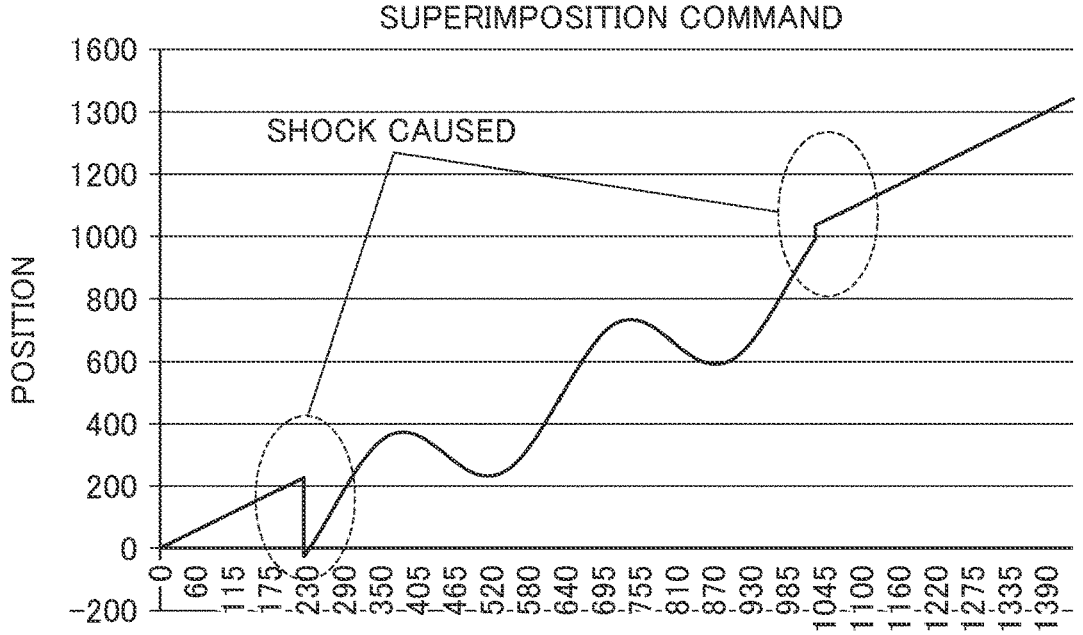
FIG. 7 is a graph showing a superimposition command in a case where a timing of starting/ending superimposition of the oscillation command of FIG. 6 on the movement command of FIG. 2 deviates from an oscillation phase at which the oscillation command is 0.

FIG. 7 is a graph showing the superimposition command in a case where a timing of starting/ending superimposition of the oscillation command of FIG. 6 on the movement command of FIG. 2 deviates from the oscillation phase at which the oscillation command is 0. The oscillation command of FIG. 6 is the cosine wave and the position on the vertical axis is offset. As is apparent from FIG. 6, the oscillation command is 0 in the case of an oscillation phase of 0°. Thus, if a timing of starting/ending superimposition of the oscillation command of FIG. 6 deviates from an oscillation phase of 0°, the oscillation command is a value other than 0, and for this reason, the command at the start/end of superimposition is discontinuous as shown in FIG. 7. In FIG. 7, portions surrounded by dashed lines indicate the start/end of superimposition, and show occurrence of great shock.

Figure 8:
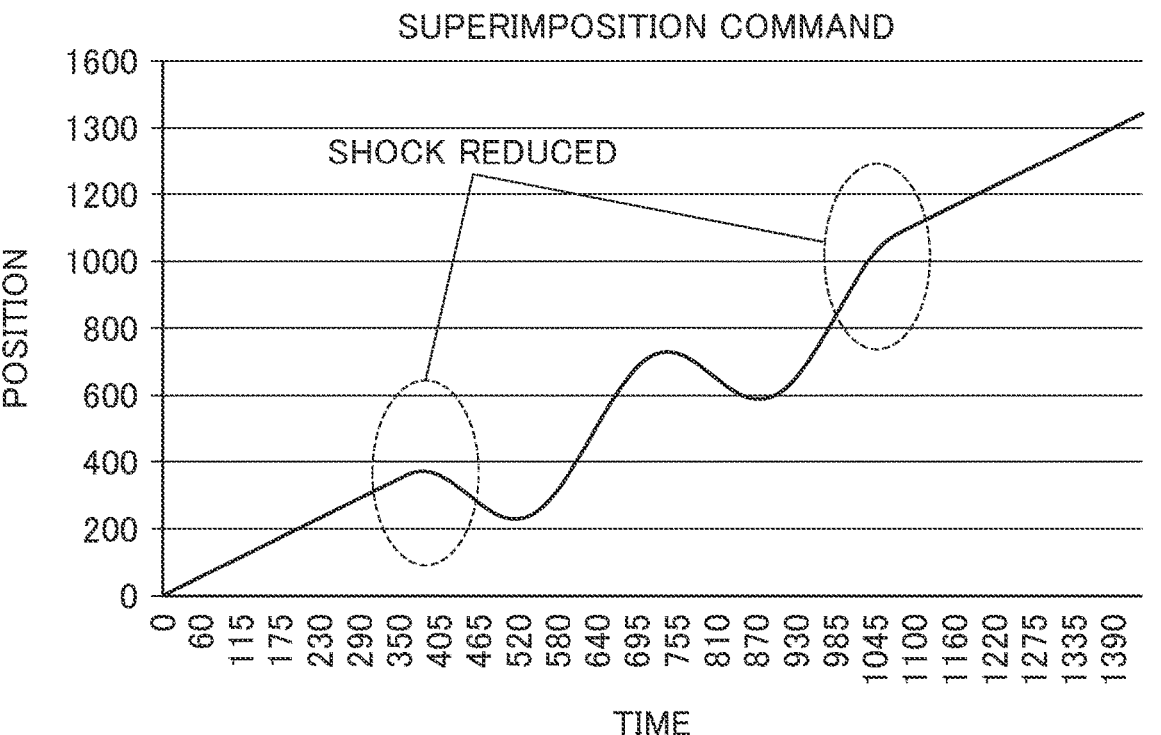
FIG. 8 is a graph showing a superimposition command in a case where a timing of starting/ending superimposition of the oscillation command of FIG. 6 on the movement command of FIG. 2 does not deviate from an oscillation phase at which the oscillation command is 0.

On the other hand, FIG. 8 is a graph showing the superimposition command in a case where a timing of starting/ending superimposition of the oscillation command of FIG. 6 on the movement corm and of FIG. 2 does not deviate from the oscillation phase at which the oscillation command is 0. If a timing of starting/ending superimposition of the oscillation command of FIG. 6 is an oscillation phase of 0°, the oscillation command is 0, and therefore, the command at the start/end of superimposition is continuous and smooth as shown in FIG. 8. In FIG. 8, portions surrounded by dashed lines indicate the start/end of superimposition, and show shock reduction.

As described with reference to FIGS. 2 to 8, oscillation starts/ends at such a timing that the oscillation command is small so that the shock caused on the machine tool can be reduced.

According to the machine tool control device 1 of the present embodiment, the following advantageous effects are produced. In the present embodiment, the oscillation start/end determinator 14 that determines the start/end of oscillation based on the oscillation command is provided, and the oscillation command is superimposed on the movement command according to the result of determination by the oscillation start/end determinator 14 to generate the superimposition command. In a case where the absolute value of the oscillation command as the specified value or less, the oscillation start/end determinator 14 determines the start/end of oscillation. With this configuration, superimposition of the oscillation command on the movement command starts/ends when the absolute value of the oscillation command is the specified value or less, and therefore, discontinuous command generation can be reduced and the shock caused on the machine tool can be reduced. Accordingly, the machining accuracy in oscillation cutting can be improved.

Second Embodiment

Figure 9:
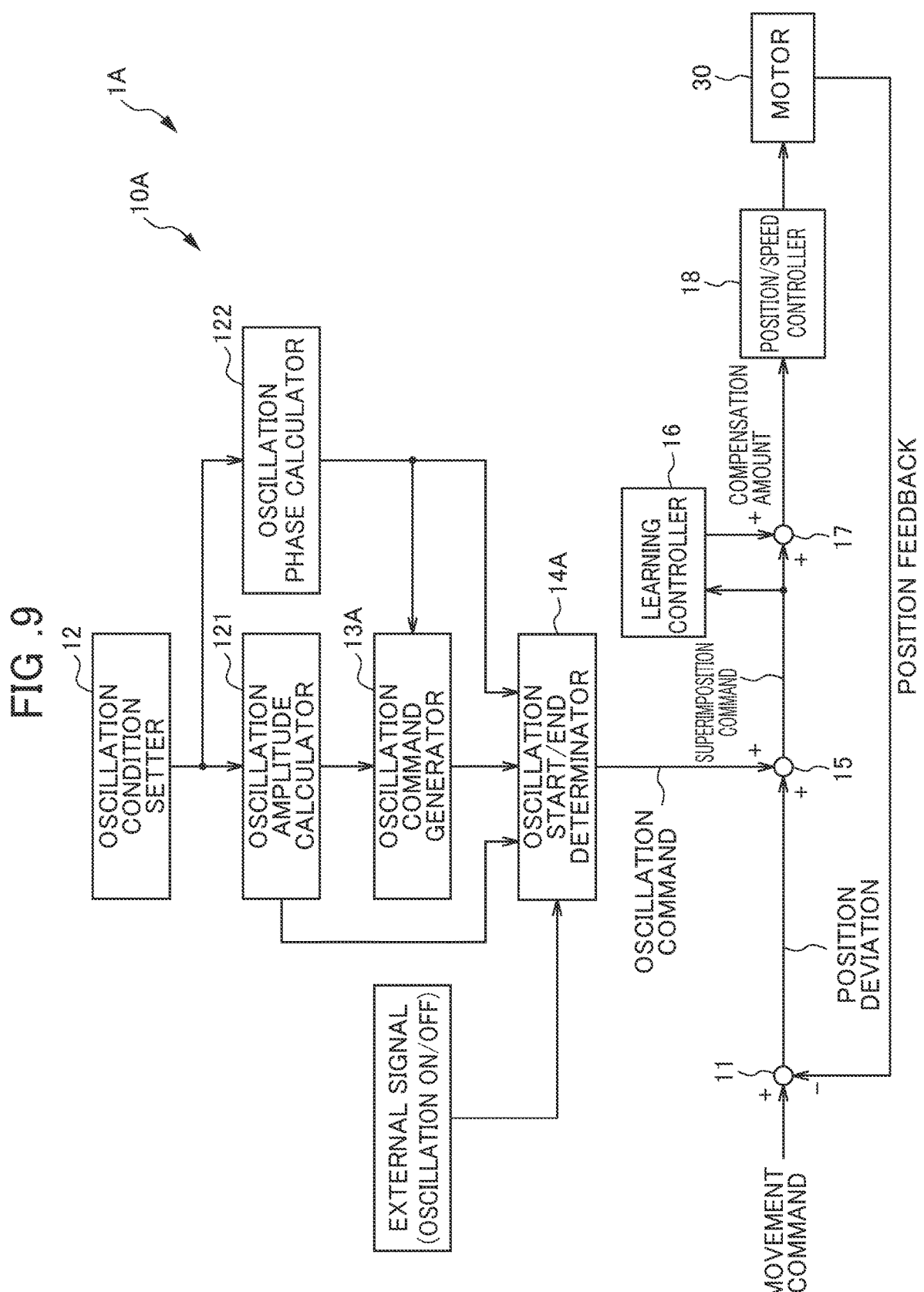
FIG. 9 is a diagram showing the configuration of a machine tool control device according to a second embodiment of the present disclosure.

FIG. 9 is a diagram showing the configuration of a machine tool control device 1A according to the second embodiment of the present disclosure. As shown in FIG. 9, the machine tool control device 1A according to the second embodiment includes a servo control device 10A, and is different from the first embodiment in that the machine tool control device 1A further includes an oscillation amplitude calculator 121 and an oscillation phase calculator 122. An oscillation command generator 13A corresponds to the oscillation command generator 13 of the first embodiment, an oscillation start/end determinator 14A corresponds to the oscillation start/end determinator 14 of the first embodiment, and other components are similar to those of the first embodiment.

The oscillation amplitude calculator 121 calculates an oscillation amplitude based on an oscillation condition. For example, the oscillation amplitude calculator 121 calculates the oscillation amplitude based on an oscillation amplitude multiplying factor set by an oscillation condition setter 12.

The oscillation phase calculator 122 calculates an oscillation phase based on the oscillation condition. For example, the oscillation phase calculator 122 calculates the oscillation phase (an oscillation frequency) based on an oscillation frequency multiplying factor set by the oscillation condition setter 12.

The oscillation command generator 13A of the present embodiment generates an oscillation command based on the oscillation amplitude calculated by the oscillation amplitude calculator 121 and the oscillation phase calculated by the oscillation phase calculator 122.

The oscillation start/end determinator 14A of the present embodiment determines the start/end of oscillation based at least on one of the oscillation amplitude calculated by the oscillation amplitude calculator 121 or the oscillation phase calculated by the oscillation phase calculator 122.

More specifically, the oscillation start/end determinator 14A may determine the start/end of oscillation when the oscillation amplitude (an amplitude value of a sine wave or a cosine wave) is a specified value or less, for example. With this configuration, a discontinuous command at the start/end of superimposition of the oscillation command can be reduced.

The oscillation start/end determinator 14A may determine the start/end of oscillation at an oscillation phase at which an absolute value of the oscillation command is a specified value or less. The specified value is set to 0 so that shock can be further reduced. In the case of the above-described sine wave-shaped oscillation command shown in FIG. 3, determination on the start/end of oscillation may be made when the oscillation phase is 0° and 180°. In the case of the above-described cosine wave-shaped oscillation command in a state in which the position on the vertical axis is offset as shown in FIG. 6, determination on the start/end of oscillation may be made when the oscillation phase is 0°.

According to the present embodiment, superimposition of the oscillation command on a movement command starts/ ends when the absolute value of the oscillation command is the specified value or less, as in the first embodiment. Thus, discontinuous command generation can be reduced and the shock caused on a machine tool can be reduced. Accordingly, machining accuracy in oscillation cutting can be improved.

Note that the present disclosure is not limited to the above-described aspects and changes and modifications made within a scope in which the object of the present disclosure can be achieved are included in the present disclosure. For example, in the second embodiment, the oscillation amplitude calculator 121 and the oscillation phase calculator 122 are provided, but only one of these components may be provided.

EXPLANATION OF REFERENCE NUMERALS 1, 1A Machine Tool Control Device
10, 10A Servo Control Device
11 First. Adder
12 Oscillation Condition Setter
13, 13A Oscillation Command Generator
14, 14A Oscillation Start/End Determinator
15 Second Adder
16 learning Controller (Learning Controller)
17 Third Adder (Learning Controller)
18 Position/Speed Controller (Controller)
30 Motor
121 Oscillation Amplitude Calculator
122 Oscillation Phase Calculator

The invention claimed is:
1. A control device for a machine tool that performs machining while causing a tool and a workpiece to oscillate relative to each other, the control device comprising a processor configured to perform:
    generating an oscillation command based on an oscillation condition;
    determining a start/end of oscillation based on the oscillation command;
    causing the tool and the workpiece to oscillate relative to each other based on a superimposition command gen-erated by superimposition of the oscillation command on a movement command according to a result of determination; and
    determining the start/end of oscillation in a case where an absolute value of the oscillation command is a specified value or less, and determining a timing of start/end of oscillation such that an amount of deviation of the timing of start/end of oscillation determined, from a timing of a start/end of oscillation specified by a machining program is within a predetermined range.

2. The control device for the machine tool according to claim 1, wherein the processor is configured to further perform:
    calculating an oscillation amplitude based on the oscillation condition;
    calculating the oscillation command based on the oscillation amplitude; and
    determining the start/end of oscillation based on the oscillation amplitude.

3. The control device for the machine tool according to claim 1, wherein the processor is configured to further perform:
    calculating an oscillation phase based on the oscillation condition;
    generating the oscillation command based on the oscillation phase; and
    determining the start/end of oscillation based on the oscillation phase.

4. The control device for the machine tool according to claim 1, wherein the processor is configured to further perform determining the start/end of oscillation at an oscillation phase at which the oscillation command is 0.

5. The control device for the machine tool according to claim 1, wherein the processor is configured to further perform determining that oscillation starts in a case where the start of oscillation is notified by an external signal and a predetermined oscillation start condition is satisfied, and determining that oscillation ends in a case where the end of oscillation is notified by an external signal and a predetermined oscillation end condition is satisfied.

6. The control device for the machine tool according to claim 1, wherein the processor is configured to further perform calculating a superimposition command compensation amount based on the superimposition command and compensating the superimposition command by addition of the calculated compensation amount to the superimposition command.

* * * * *